United States Patent Office 3,449,149
Patented June 10, 1969

3,449,149
TRANSFER SHEET AND PROTECTIVE
COMPOSITION THEREFOR
Norbert F. Toussaint, 8516 Springfield Ave.,
Skokie, Ill. 60076
No Drawing. Filed May 25, 1965, Ser. No. 458,773
Int. Cl. B41m 5/10
U.S. Cl. 117—36.4                                    10 Claims

ABSTRACT OF THE DISCLOSURE

Transfer sheets containing a pigment or dye for transfer by pressure, as in carbon paper and the like, have a protective film for high gloss appearance and elimination of smudging. The film is applied as a hot melt and contains paraffin wax with or without other wax, with or without selected resins and viscosity controlling ingredients, microcrystalline wax, and at least 1% of polymeric microcrystalline wax.

---

The present invention relates to transfer sheets, and in particular, to a protective film composition for the active transfer composition.

Transfer sheets, such as spirit carbon paper, transfer carbons, hectowriter ribbons, typewriter ribbons, and like duplicating materials, have a waxy transfer coat, colored by a content of pigment, dye or other visible agent. Such transfer coat has an exposed surface, is not only smudgy and difficult to handle for normal use, but is subject to offsetting when in use. Therefore, it is a practice to provide a protective film coat over the transfer coat as exemplified by U.S. Patents No. 2,671,734 and No. 2,777,781. The latter patent applies a hot-melt to give a protective film presenting a desirable uniform sheen, rather than a dull and dirty appearance.

The film composition in the final product and in the method of application must be such as to avoid certain possible disadvantages.

When the transfer coat contains a dye, there is the possibility of the dye bleeding from the transfer coat into the protective film. Bleeding leads to some offsetting, but more particularly, it results in an irregular dirty surface of the film coat because of non-uniform bleeding. When the film is glossy the dirty regions are visible, because the gloss is lacking. When the film is dull, they are not visible.

When the transfer coat contains plasticizer, the latter may bleed into the film coat not only giving an irregular surface as to sheen or texture, but also modifying the transfer coat from desired softness toward hardness. Such bleeding lowers the shelf life of the transfer product. Migration of plasticizer from a transfer coat containing dye, carries the dye into the film coat, thus leading to offsetting and a dirty surface.

When the film coat is applied as a solution of the film composition in a volatile solvent, usually chosen so as to negative dissolution of the transfer coat, the film-protected product can have trace quantities of residual solvent giving an undesired long-lasting odor, or softening of the film.

Consequently, the preferred film compositions are hot melts. As such, the melting point controls the temperature of application. The applied hot melt must not function to a marked degree to dissolve or merge with the transfer coat. Hot melts are applied as a thin layer and quickly cooled.

Protective film compositions must be such that they also transfer and carry the transfer coat with them. They are non-tacky to the fingers, but tacky on impact so that they do transfer to a master surface. Combinations of waxes and modifying agents are employed.

It is the object of the present invention to produce a waxy hot-melt film-forming composition applicable to transfer coatings for imparting a desirable clean smooth surface, which is long-lasting to impart adequate shelf life for commercial purposes.

It is a particular object of the invention to include in the waxy composition high in content of paraffin wax a polymeric hydrocarbon wax for the foregoing objectives.

The prevailing process for producing transfer sheets is to apply a transfer composition to a continuous web of carrier sheet, preferably a tissue paper, and to run the resulting sheet at high speed through a coating machine to apply the protective film as a hot melt, the speed being for example 30 to 150 feet per minute depending upon the process of application. When the film composition of the present invention is applied to a web previously coated with the transfer coat in a separate operation, the web may travel at 200 to 350 feet per minute, and in some special cases 1,000 feet per minute. When it is applied in the same operation promptly after applying the transfer coat, the speed is limited to 20 to 100 feet per minute by reason of the character of the transfer coat application. Therefore, the film composition of the present invention is varied to accommodate it to a particular speed even higher than 150 feet per minute, to the characteristics of the coating machine, and to the melting point of the transfer composition onto which the hot melt film composition is applied. A particular modification of the protective film composition is the introduction of varying amounts of an agent to increase the viscosity of the film composition.

The composition of the present invention comprises essentially waxy material of which a major portion is paraffin wax, and a minor portion is waxy material selected from the group consisting of polymeric microcrystalline wax, and a mixture of microcrystalline wax and compatible hard wax or resin, including natural waxes, like carnauba, montan, and ourricurri, and synthetics such as polymerized alpha or beta pinene, of which commercial forms are available under the trademark Piccolyte A-115 and S-115, respectively, from Pennsylvania Industrial Chemical Corp. of Clairton, Pa.

Wax alone gives a dull film. Heretofore, polyethylene resin has also been used, giving a high gloss and slipperiness to the film. The present invention overcomes the dull appearance and can provide high gloss and a longer life, by the inclusion of polymeric microcrystalline wax, in amount from 1% to 25% of the composition. Below 1% its effect is not sufficient.

To increase the viscosity of the composition a copolymer of ethylene and vinyl acetate is employed which is compatible with the rest of the composition. The total total content of polymeric material may vary from 1% to 25% of which up to 10% may be the copolymer.

The illustrated compositions given below are in three classifications. In Table I, no copolymer is used for viscosity control.

In Table II the copolymer is used. In Tables I and II only hydrocarbon waxes are employed.

In Table III a wax mixture of Table I and compatible hard wax or resin is employed.

In the following tables, the principal ingredients are further identified as follows:

Paraffin wax.—A mixture of straight-chain hydrocarbons with molecular weights in the approximate range 360 to 500.

Microcrystalline wax.—A mixture of straight-chain and branch-chain hydrocarbons of high molecular weights. Different fractions are commercially available, such as B, C and D in the tables following having, respectively, minimum melting points of 180° F., 165° F. and 150° F.

Polymeric microcrystalline wax is a product sold as Polymekon by the Warwick Wax Division of The Western Petrochemical Corporation, Chanute, Kans. It is a polymerized microcrystalline wax having the following specifications:

| | |
|---|---|
| Specific gravity | 0.932. |
| Refractive index at 203° F. | 1.4418. |
| Softening point | 195°–200° F. |
| Melting point (drop), ASTM | 200°–225° F. |
| Penetration, ASTM, at 77° | 0–3. |
| Color | Light yellow. |
| Viscosity at 230° F. | 50–100 cps. |
| Iodine number | 11.0. |
| Acid number | 0.0. |
| Saponification number | 0.0. |

A particular form of Polymekon carries a trace of an alkaline catalyst used in the polymerization. The alkaline reaction is beneficial in the present invention in the case of dyes in the transfer coat which are decolorized by alkali. Should such a dye bleed into the film composition, the alkali neutralizes it and prevents the colored "dirt" spots on the surface of the film.

Polymekon is insoluble in common mineral oils used in transfer coats, and thus makes the film composition a more effective barrier than low-molecular-weight polyethylenes which are soluble in such oils. This contributes to the prevention of bleeding.

Copolymer of ethylene and vinyl acetate.—Among these are ones which are compatible with waxes, which provide viscosity in a coatable range, and which do not interfere with the adhesion of the film composition to the master on impact used to transfer it and the transfer coat. A suitable one is Elvax 420, having 18% of vinyl acetate, sold by E. I. du Pont de Nemours and Co., of Wilmington, Del. Another is Comer DQD–6225, a product of Union Carbide Corporation, Park Avenue, New York, N.Y.

TABLE I.—COMPOSITIONS IN PERCENT BY WEIGHT

| | Agent | 1 | 2 | 3 |
|---|---|---|---|---|
| A | Paraffin wax | 83.0 | 80.5 | 79.5 |
| B | Microcrystalline wax, min. M.P. 180° F. | 10.0 | 10.0 | 10.0 |
| C | Microcrystalline wax, min. M.P. 165° F. | 4.0 | 4.0 | 4.0 |
| D | Microcrystalline wax min. M.P. 151° F. | | | |
| E | Polymeric microcrystalline wax | 3.0 | 5.5 | 6.5 |

TABLE II.—COMPOSITIONS IN PERCENT BY WEIGHT

| Agent | 4 | 5 | 6 | 7 | 8 | 9 | 10 | 11 | 12 | 13 | 14 | 15 | 16 |
|---|---|---|---|---|---|---|---|---|---|---|---|---|---|
| A | 79.7 | 77.5 | 77.4 | 75.0 | 79.0 | 77.0 | 75.0 | 75.0 | 75.0 | 70.0 | 71.5 | 85.0 | 71.8 |
| B | 8.0 | 10.0 | 9.0 | 10.0 | 9.0 | 9.0 | 9.0 | 14.0 | | 10.0 | 9.0 | 10.0 | 9.0 |
| C | 4.4 | 4.0 | 3.6 | 4.0 | 4.0 | 4.0 | 4.0 | | 14.0 | 10.0 | 4.0 | 4.0 | 3.8 |
| D | | | | | | | | | | | | | |
| E | 5.4 | 6.0 | 5.0 | 6.0 | 7.0 | 7.0 | 7.0 | 6.0 | 6.0 | 5.0 | 5.5 | 1.0 | 5.4 |
| F [1] | 2.5 | 2.5 | 5.0 | 5.0 | 1.0 | 3.0 | 5.0 | 5.0 | 5.0 | 5.0 | 10.0 | | 10.0 |

[1] Copolymer.

TABLE III.—COMPOSITIONS IN PERCENT BY WEIGHT

| Agent | 17 | 18 | 19 | 20 | 21 | 22 | 23 | 24 |
|---|---|---|---|---|---|---|---|---|
| (A) P.W. | 72.4 | 72.4 | 72.4 | 72.4 | 86.0 | 77.0 | 60.0 | 65.0 |
| (B) M.W.–1 | 9.0 | 9.0 | 9.0 | 9.0 | | | | |
| (C) M.W.–2 | 3.6 | 3.6 | 3.6 | 3.6 | | | | 10.0 |
| (D) M.W.–3 | | | | | 13.0 | 13.0 | 15.0 | |
| (E) Poly. W. | 5.0 | 5.0 | 5.0 | 5.0 | 1.0 | 10.0 | 25.0 | 5.0 |
| (F) Copoly. | | | | | | | | |
| Carnauba | | | 10 | | | | | |
| Montan | | 10 | | | | | | 20.0 |
| Piccolyte | 10.0 | | | | | | | |
| Ourricurri | | | | 10 | | | | |

Among the numerous compositions given above, Composition No. 6 is a preferred one for continuously coating a web moving at 40 to 50 feet per minute, which web has a dye-containing transfer coat for spirit duplication. Gloss results without buffing.

The compositions given above start to melt at the melting point of the paraffin content. They become clear hot melts at temperatures upwardly from about 157° F., depending upon the particular composition. The preferred compositions are clear hot melts at under 175° F. They may be applied at 155° to 185° F. to a conventional transfer coat, such as the following:

| | Percent |
|---|---|
| Carnauba | 11 to 14 |
| Crystal violet dye | 40 to 58 |
| Castor oil | 2 to 8 |
| Mineral oil | 15 to 30 |

In a coating machine having a slow moving web the viscosity may be increased by including the described copolymer in the composition.

The compositions described impart adequate flexibility and can provide gloss to transfer sheets with barrier properties not available with polyethylene resin and wax.

When the master sheet assembled with the film-protected transfer sheet is pressed, as by a stylus or typewriter key, the film, being tacky only under impact, has transfer properties and adheres to the master, carrying the transfer coat with it. Thus, the transferred material is a two-layered body of waxy substance of which the exposed layer contains the dye or pigment to be released by the master in making multiple copies.

From the foregoing tables it is evident that the composition may vary within the following ranges:

| | Percent |
|---|---|
| Microcrystalline wax | 12 to 20 |
| Polymeric material: | |
| Polymeric microcrystalline wax without or with up to 10% of said compatible copolymer | 1 to 25 |
| Other material: | |
| Paraffin wax without or with up to 20% of hardening wax or resin based on the total composition | 60 to 86 |

The invention not only contemplates the film composition, but also transfer products protected by a film of said composition, as set forth in the appended claims.

I claim:

1. A transfer product adapted for use with pressure as from a stylus or a typewriter key, comprising a carrier base coated with a colored transfer composition, and a protective hot-melt film united to said transfer composition, said film comprising essentially a transferable waxy composition containing at least 60% of paraffin wax and upwardly from 1% to 25% of polymeric microcrystalline wax.

2. A transfer product according to claim 1 in which the hot-melt film contains a compatible viscosity-increasing copolymer of ethylene and vinyl acetate in amount up to 10%.

3. A transfer product adapted for use with pressure as from a stylus or a typewriter key, comprising a carrier base coated with a colored transfer composition, and a protective hot-melt film united to said transfer composition, said film comprising essentially from 12% to 20% of microcrystalline wax, from 60% to 86% of a waxy material selected from the group consisting of paraffin wax and a mixture of paraffin wax and compatible hardening material, said mixture containing up to 20% of said hardening material selected from the group consisting of compatible waxes, resins, and mixtures thereof, and from 1% to 25% of polymeric material selected from the group consisting of polymeric microcrystalline wax and a mixture of said polymeric microcrystalline wax and a compatible copolymer of ethylene and vinyl acetate, said copolymer being present in amount up to 10%.

4. A transfer product adapted for use with pressure as from a stylus or a typewriter key, comprising a carrier base coated with a colored transfer composition, and a protective hot-melt film united to said transfer composition, said film comprising essentially from 12% to 20% of microcrystalline wax, from 60% to 86% of paraffin wax, and from 1% to at least 25% of polymeric microcrystalline wax.

5. A transfer product adapted for use with pressure as from a stylus or a typewriter key, comprising a carrier base coated with a colored transfer composition, and a protective hot-melt film united to said transfer composition, said film comprising essentially from 12% to 20% of microcrystalline wax, from 60% to 86% of paraffin wax, and from 1% to 25% of polymeric material selected from the group consisting of polymeric microcrystalline wax and a mixture of said polymeric microcrystalline wax and a compatible copolymer of ethylene and vinyl acetate, said copolymer being present in amount up to 10%.

6. A transfer product adapted for use with pressure as from a stylus or a typewriter key, comprising a carrier base coated with a colored transfer composition, and a protective film united to said transfer composition, said film comprising essentially from 12% to 20% of microcrystalline wax, from 60% to 86% of a waxy material selected from the group consisting of paraffin wax and a mixture of paraffin wax and compatible hardening material, said mixture containing up to 20% of said hardening material selected from the group consisting of compatible waxes, resins, and mixtures thereof, and from 1% to 25% of polymeric microcrystalline wax.

7. A transfer product adapted for use with pressure as from a stylus or a typewriter key, comprising a carrier base coated with a transfer composition containing a transfer dye rendered colorless by alkali, and a protective hot-melt film united to said transfer composition, said film comprising essentially a transferable waxy composition containing at least 60% of paraffin wax and upwardly from 1 to 25% of polymeric microcrystalline wax characterized by a content of alkali.

8. The product of claim 7 in which the alkali is retained alkaline catalyst.

9. A transfer product adapted for use with pressure as from a stylus or a typewriter key, comprising a carrier base coated with a dye-containing transfer composition, and a protective hot-melt film united to said transfer composition, said film comprising essentially a transferable waxy composition containing at least 60% of paraffin wax and upwardly from 1% to 25% of polymeric microcrystalline wax.

10. A transfer product adapted for use with pressure as from a stylus or a typewriter key, comprising a carrier base coated with a dye-containing transfer composition, and a protective hot-melt film united to said transfer composition, said film comprising essentially from 12% to 20% of microcrystalline wax, from 60% to 86% of a waxy material selected from the group consisting of paraffin wax and a mixture of paraffin wax and compatible hardening material, said mixture containing up to 20% of said hardening material selected from the group consisting of compatible waxes, resins, and mixtures thereof, and from 1% to 25% of polymeric material selected from the group consisting of polymeric microcrystalline wax and a mixture of said polymeric microcrystalline wax and a compatible copolymer of ethylene and vinyl acetate, said copolymer being present in amount up to 10%.

References Cited

UNITED STATES PATENTS

| | | | |
|---|---|---|---|
| 1,864,097 | 6/1932 | Sherman | 117—36.4 |
| 2,671,734 | 3/1954 | Rosenblum | 117—36.4 |
| 2,777,781 | 1/1957 | Kordig et al. | 117—36.4 |
| 3,062,676 | 11/1962 | Newman et al. | 117—36.4 |
| 3,169,880 | 2/1965 | Strauss | 117—36.4 |
| 3,197,426 | 7/1965 | Zaayenga | 117—158 |
| 3,297,610 | 1/1967 | Moyer | 117—158 |
| 3,305,383 | 2/1967 | Gordy | 117—158 |

FOREIGN PATENTS

| | | |
|---|---|---|
| 855,912 | 12/1960 | Great Britain. |
| 951,645 | 3/1964 | Great Britain. |

MURRAY KATZ, *Primary Examiner.*

U.S. Cl. X.R.

117—155, 158; 260—28.5

UNITED STATES PATENT OFFICE
CERTIFICATE OF CORRECTION

Patent No. 3,449,149                                June 10, 1969

Norbert F. Toussaint

It is certified that error appears in the above identified patent and that said Letters Patent are hereby corrected as shown below:

Column 2, line 38, "and" should read -- microcrystalline wax, and --.

Signed and sealed this 10th day of March 1970.

(SEAL)
Attest:

Edward M. Fletcher, Jr.
Attesting Officer

WILLIAM E. SCHUYLER, JR.
Commissioner of Patents